May 5, 1953          C. O. LARSON          2,637,358
SAW HORSE WITH A SHIFTABLE TOOL TRAY
Filed April 27, 1948
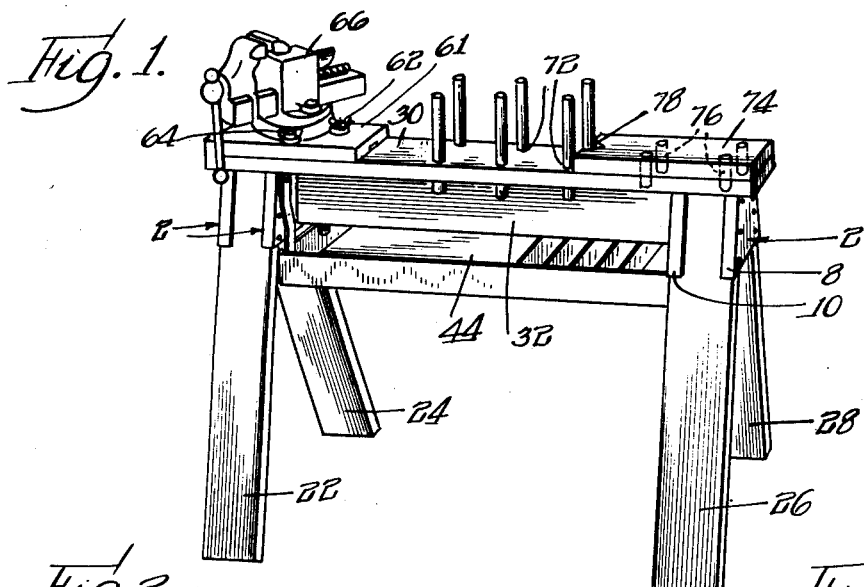
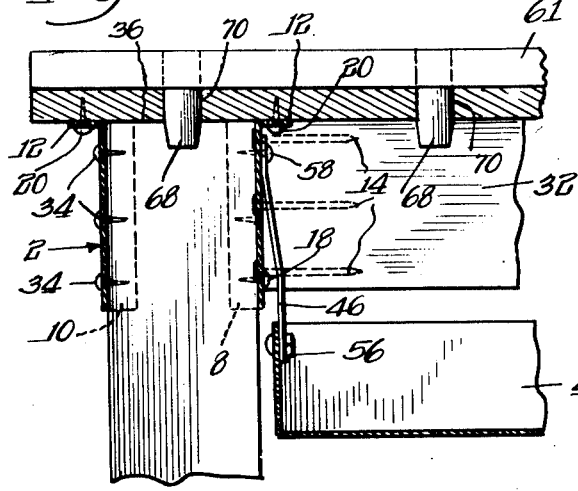
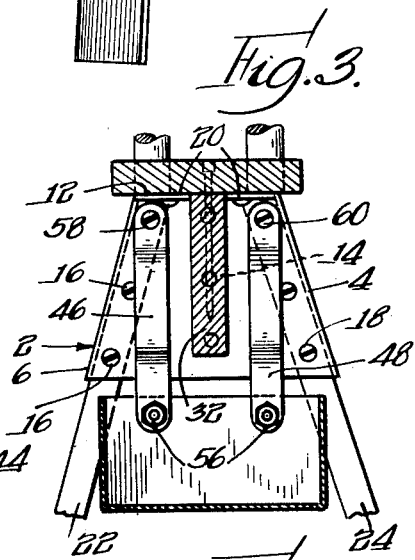
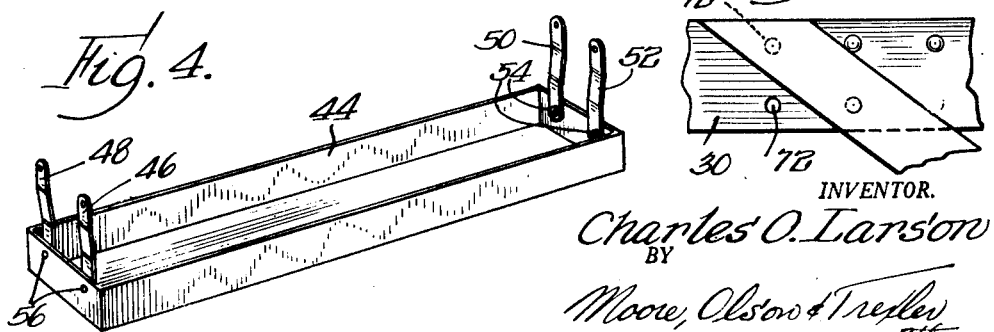
INVENTOR.
Charles O. Larson
BY
Moore, Olson & Trexler
attys.

Patented May 5, 1953

2,637,358

UNITED STATES PATENT OFFICE 2,637,358

SAW HORSE WITH A SHIFTABLE TOOL TRAY

Charles O. Larson, Sterling, Ill.

Application April 27, 1948, Serial No. 23,559

1 Claim. (Cl. 144—286)

This invention relates to saw horse constructions, and particularly to saw horses equipped with work trays and also to saw horses wherein the top board is provided with specially disposed holes for the reception of pegs.

Among the objects of the present invention is to provide a saw horse with a swingable tray member normally disposed in position beneath the top board of the saw horse and suspended therefrom in such a manner that it can be swung outwardly so that it is accessible from either side of the support, the tray being constructed to receive various tools, nails, and the like.

Another object of the invention resides in providing a saw horse which includes predeterminedly cut timbers and metallic leg brackets adapted to embrace one of the timber members forming the top, a cross strut and leg timbers for supporting the same rigidly in upright disposition to form a saw horse, and wherein the leg clamping brackets themselves form suspension means for a work tray swingably mounted therefrom and normally to underlie the top timber of the saw horse.

Yet another object of the invention resides in the provision of the top board of a saw horse with spaced apart, symmetrically arranged holes for pegs which, when inserted in predetermined arrangement provide guide means for cutting timbers and also provide means for receiving pegged attachments which are easily predeterminedly positioned on the top member for attachment thereto.

These and other objects of the invention will be apparent from a perusal of the following specification when taken in connection with the accompanying drawing, wherein:

Figure 1 is a perspective view of the invention including the sheet metal plates engaging the plurality of timbers for forming the rigid structural joint. In particular, the invention is illustrated preferably as a saw horse. In this figure, the swingable tray is shown mounted on the undersurface of the saw horse. One end of the top plate of the saw horse is shown as having the vise and its plate demountably attached thereto. The other end of the support is shown as supporting a planing block or guide plate, and the intermediate portion of the support is shown as receiving the dowels or pins forming the miter box.

Figure 2 is a view partly in section, showing the manner of attaching the plates to the legs and the underside of the top support.

Figure 3 is an end view of the same.

Figure 4 is a perspective view of the tray with its suspension links.

Figure 5 is a different arrangement of the pegs, showing the manner in which the wood may be cut at an angle to the top of the saw horse.

The invention in its simplest form comprises a pair of sheet metal plates of the construction illustrated in Figure 2, and wherein a pair of such plates when assembled in the manner shown in the drawing are adapted to hold in assembled relation the upper ends of a pair of converging pieces of timber and an upper length of timber disposed across the apex of the converging pieces of timber and disposed transversely thereof.

In the preferred form of the invention it is illustrated as a saw horse wherein four of the plates are used, there being two pairs, one for each end of the saw horse. In order more clearly to describe the invention, it will be illustrated and described in connection with a saw horse.

By reference to the drawings, it will be seen that I have provided four clamping plates, each preferably formed of sheet metal and comprising a main body portion 2 formed somewhat of a truncated triangle in shape with converging edges 4 and 6 and converging flanges 8 and 10, which are bent at right angles to the plane of the face 2 of the clamp. The upper portion of this face 2 is provided with a laterally bent flange 12 which extends at right angles to the plane of the face 2 and in a reverse direction to that of the flanges 8 and 10.

The face portion 2 of some of these plates, and preferably all of the plates, is provided with a plurality of nail or screw holes for the reception of screws or nails 14, there being preferably three arranged in a vertical line extending through the vertical center of the plate 2. In addition, each flat face 2 is provided along the converging marginal portions 4 and 6 with a row of spaced apart nail or screw holes for the reception of nails or screws 16 and 18, and in addition the flange 12 is provided with a series of spaced apart bolt or nail holes for the reception of screws 20. If desired, one of each of the pairs of metal plates may have the vertical holes 14 omitted as shown in Figure 1.

In conjunction with these metal clamping plates, I have been able by means of the construction thereof to utilize relatively narrow, light pieces of lumber, rather than using pieces of two-by-four as heretofore. These legs are disposed with their wider faces confronting. For instance, I may utilize four leg members 22, 24, 26 and 28, which are identical in construction, and associated therewith I provide an additional wooden top support 30, which is of the same width and thickness as the leg members but preferably has a greater length. So, also, another wooden strut 32 is utilized, the same being of similar thickness and width but of a shorter dimension than the leg member. This latter provides a rigid brace and underlies the top member 30 between the two pairs of legs.

In assembling the construction, for instance, the two legs 22 and 24 are inserted between a pair of plates 2 in the manner best illustrated in Figures 2 and 3, the flanges 8 and 10 overlying the wider faces of these legs 22 and 24. Screws or nails 34 pass through the screw holes 16 or 18 into the relatively narrow side edges of the leg members 22 and 24. In this position the tops 36 of the leg members are in the same upper horizontal plane, as shown in Figure 3. At the same time the top rail of the saw horse is positioned to extend transversely across the tops of the two pairs of converging leg members thus held by the plates, and bolts, screws or nails 20 pass through the nail holes of the horizontal flange 12 of each plate into the underside of the broader face of the top member 30.

In addition, the cross brace 32 is assembled between the innermost of the two pairs of assembled plates and nails or screws 14 pass through the nail holes therefor, which as heretofore described are disposed in a vertical line centrally of the inner plate and these nails or screws engage into the opposed ends of the cross brace 32. The top beam 30 and the cross brace 32 are in addition rigidly united together by spaced nails or screws in the manner illustrated very clearly in Figure 3.

Tray

The tray 44 is suspended from between the spaced legs of the saw horse by means of four links 46, 48, 50 and 52, each of said links having its lower end pivotally attached to the spaced end portion of the tray as at 54 and 56. The upper end of each of the links is pivotally fastened on one of the bolts or nails, such as 58 and 60, through one of the face portions 2 of the leg brackets. In this position it will be apparent that the tray normally depends directly downwardly beneath the top rail 30 of the saw horse and yet it is capable of being swung to one or the other side by pushing upon it. When swung to the side, the contents of the tray are directly accessible in the manner well understood.

So also the top rail 30 of the saw horse is utilized for a number of operations. For instance, in Figure 1 I show a rectangular wooden base plate 61 which has bolted to its top face as at 62 and 64 a vise 66 of desired construction, and in addition the underside of this base plate 61 is provided with four depending pegs 68 which fit into four registering holes 70 in the top of the rail whereby the vise is securely held in position thereon. It will be noted that the holes are arranged in such depth that the bottoms of the pins 68 will not strike the tops of the legs.

In addition, the top rail is provided with a series of spaced holes 72 at an intermediate portion therealong, which holes are shown in Figure 1. These holes are for the purpose of receiving vertically disposed dowel pins. The dowel pins are arranged so that when they are inserted in their holes in the top rail they provide a miter box for a two-by-four. These dowel holes are spaced the entire length of the board on four and one half inch centers each way. In addition the top rail is provided with spaced apart, elongated end holes whereby the saw horse can be conveniently carried.

Figure 1 shows the manner in which the dowel pins are insertable for the purpose of cutting timber. In Figure 1 the dowel pins may act as the miter box, the lumber being guided by the pins in and the pins turn forming the proper angle for forming a miter cut through the board.

In addition, another arrangement is possible whereby the dowel pins may be utilized in another arrangement for cutting wide boards on an angle. For instance, by turning a wide board at an angle, the end of the board may be cut at an angle of 45°.

In addition, there is provided a planing block 74 likewise provided with four dowels 76 attached thereto. The planing block, in addition, is provided with a V-shaped notch 78 at one end which is adapted to form an end support for the board when planing the same.

From the foregoing it will be seen that I have provided a joint and particularly I have provided a saw horse wherein I have been able to utilize lightweight wood of relatively narrow dimension rather than the usual two-by-fours and by the construction of the clamping plates and the arrangement of the timbers I am enabled to hold these lightweight timbers rigidly and ruggedly in assembled relation so as to provide a very sturdy and strong saw horse and likewise to provide a very sturdy and strong joint between the angularly disposed relatively light timbers composing the joint. By the same token, I am enabled to provide a compact saw horse comprising four identical legs of lightweight, relatively narrow dimensioned timbers and a top member assembled thereto so as to provide a broad top for the saw horse.

It will also be evident that by the provision of the spaced holes on four and one half inch centers longitudinally and transversely of the top rail of the saw horse, and the dowel pins, I have provided a very convenient means for not only holding a vise at one end and a planing block at the other end, but have also provided dowel receiving means in association therewith whereby the saw horse may act not only as a vise bench, but also as a miter box and also as a support for a plane and also for sawing various pieces of timber at desired angles, and all of which is arranged demountably so that the vise and the planing block and the dowel pins can all be removed from the top rail for packing or transportation. So also is the saw horse arranged for receiving in a very simple manner the carpenter's tray, which is swingably mounted so that it is accessible from either side of the saw horse and yet when in normal depending position is well out of the way for use of the top rail of the saw horse in the manner illustrated in the drawings.

This application is a continuation in part of my prior application filed February 14, 1945, Serial Number 577,747, issued August 9, 1949, as Patent Number 2,478,828.

Changes may be made in the form, construction and arrangement of the several parts without departing from the spirit and scope of the invention, or sacrificing any of its attendant advantages, the form herein described being a preferred embodiment for the purpose of illustrating the invention.

Having thus described the invention, what is claimed as new and desired to be secured by Letters Patent is:

A saw horse comprising a relatively narrow, elongated top beam, a pair of downwardly diverging legs at each end portion of the beam, means for securing the tops of each pair of legs together and to the beam and including opposed pairs of inner and outer bracket plates having fasteners passing therethrough, pairs of relatively long transversely spaced links, each pivotally mounted at its upper end to a fastener on an inner bracket plate and depending downwardly between said pairs of legs for free swinging movement, and a tray of less length than the distance apart of said pairs of legs and of a width at least equal to the width of said top beam, the lower ends of said links being pivotally connected to the end walls of said tray for swingably supporting the tray from said bracket plates in a normally central position below said beam and within the exterior planes of the diverging legs, the spaced pivotal connections of the ends of said links permitting shifting movement of said tray outwardly to either side of the top beam for ready access to the contents of the tray while retaining said tray in a horizontal position.

CHARLES O. LARSON.

References Cited in the file of this patent

UNITED STATES PATENTS

| Number | Name | Date |
|---|---|---|
| 82,095 | Dibble | Sept. 15, 1868 |
| 307,440 | Crispin | Nov. 4, 1884 |
| 514,012 | Lewis | Feb. 6, 1894 |
| 716,805 | Benedict | Dec. 23, 1902 |
| 1,150,126 | Labadie | Aug. 17, 1915 |
| 1,183,270 | Benjamin | May 16, 1916 |
| 1,284,170 | Ballantyne | Nov. 5, 1918 |
| 1,479,209 | Topp | Jan. 1, 1924 |
| 1,569,236 | Puterbaugh | Jan. 12, 1926 |
| 1,954,708 | Mass | Apr. 10, 1934 |
| 2,197,187 | Larson | Apr. 16, 1940 |
| 2,330,766 | Walstrom | Sept. 28, 1943 |
| 2,478,828 | Larson | Aug. 9, 1949 |